United States Patent [19]

Fulmer

[11] Patent Number: 5,395,195
[45] Date of Patent: Mar. 7, 1995

[54] THREAD-FORMING SCREW WITH TRI-ROUNDULAR, TAPERED END

[75] Inventor: James G. Fulmer, Addison, Ill.
[73] Assignee: James Fulmer, Elmhurst, Ill.
[21] Appl. No.: 85,170
[22] Filed: Jul. 2, 1993

Related U.S. Application Data

[63] Continuation-in-part of Ser. No. 958,174, Oct. 8, 1992, Pat. No. 5,242,253.

[51] Int. Cl.⁶ .................. F16B 25/00; F16B 35/04
[52] U.S. Cl. ............................ 411/386; 411/416; 411/421
[58] Field of Search ............... 411/386, 387, 416, 418, 411/420, 421, 426

[56] References Cited

U.S. PATENT DOCUMENTS

| | | | |
|---|---|---|---|
| 3,295,154 | 1/1967 | Watson et al. | 411/416 X |
| 3,455,360 | 7/1969 | Simons . | |
| 3,800,585 | 4/1974 | Simons et al. | 72/469 |
| 3,818,749 | 6/1974 | Yankee et al. | 72/469 |
| 3,850,074 | 11/1974 | Simons . | |
| 3,868,871 | 3/1975 | Yankee et al. | 76/107 R |
| 3,878,759 | 4/1975 | Carlson | 411/416 |
| 3,918,345 | 11/1975 | Phipard, Jr. . | |
| 3,934,444 | 1/1976 | Simons | 72/88 |
| 3,945,272 | 3/1976 | Simons | 76/107 R |
| 4,315,340 | 2/1982 | Veldman | 411/416 X |

Primary Examiner—Neill R. Wilson
Attorney, Agent, or Firm—Emrich and Dithmar

[57] ABSTRACT

A thread-forming screw includes a tapered end portion having a tri-roundular cross section with three spaced flats and three threaded, round portions disposed in an alternating manner about the screw's periphery. The screw is formed by inserting a tapered blank between paired dies each having threads provided with undulations along their lengths corresponding to the circumference of the screw blank so as to form a trilobular thread on the screw which spirals around its circumference from one end of the cylindrical, untapered portion of the screw to the other in a direction opposite to that of the threads. While the untapered portion of the screw is provided with fully crested threads, the tapered end portion includes partially formed, or somewhat flattened, threads. The three spaced flats on the tapered end of the screw provide relief from contact with the workpiece into which the screw is driven for receiving deformed portions of the workpiece as the screw is driven into a workpiece aperture. The relief gaps, or pockets, facilitate driving the screw into the workpiece while ensuring a high strip force. In a preferred embodiment, the tapered end of the screw has 2-3 pitches, while the flats extend 3-4 pitches from the end of the screw.

6 Claims, 3 Drawing Sheets

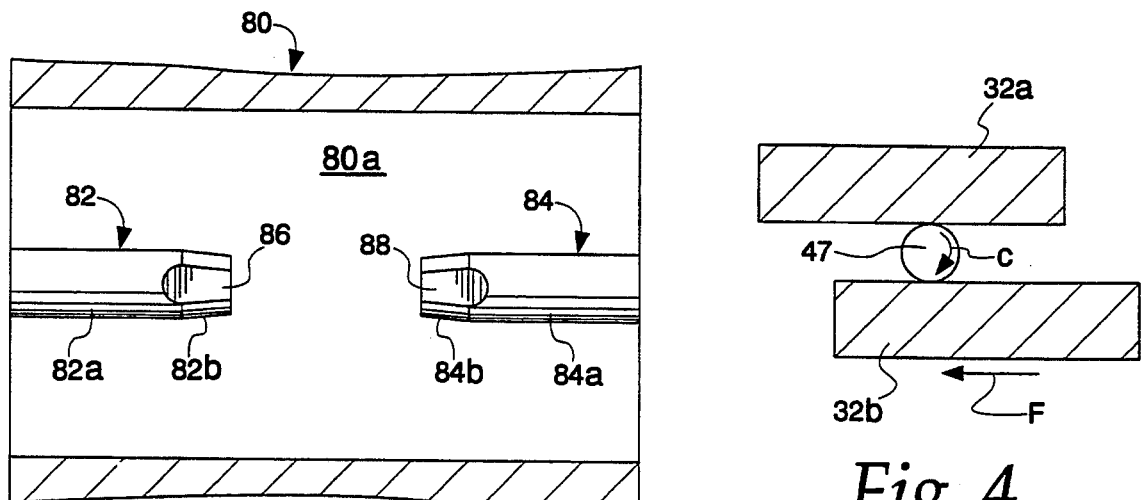
Fig. 10
Fig. 4
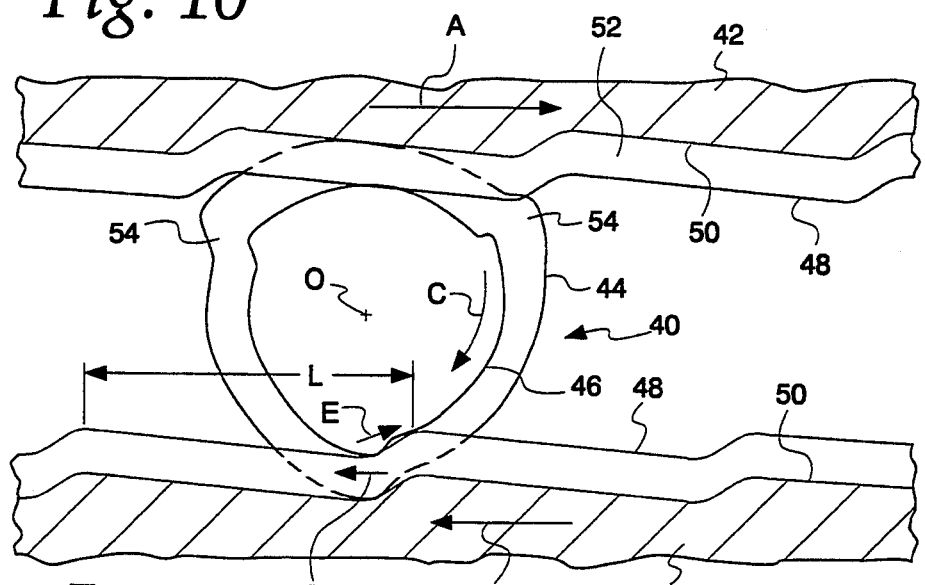
Fig. 5
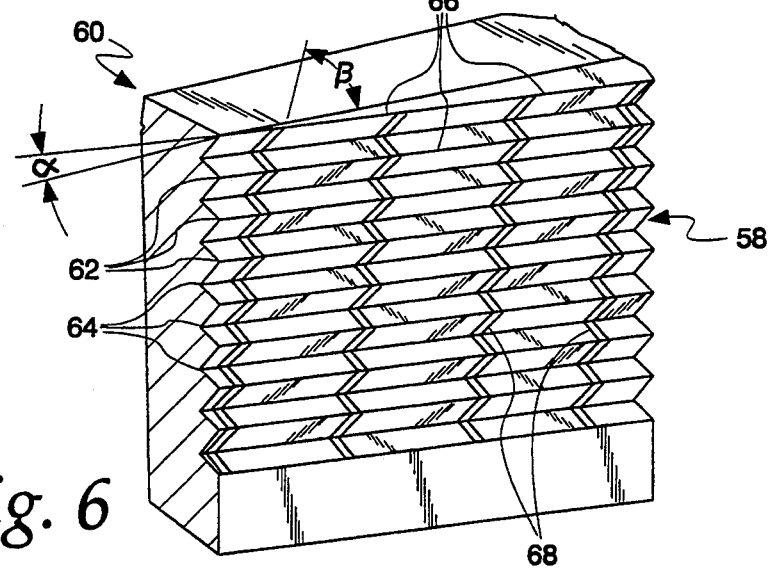
Fig. 6

THREAD-FORMING SCREW WITH TRI-ROUNDULAR, TAPERED END

CROSS REFERENCE TO RELATED APPLICATION

This is a continuation-in-part of U.S. patent application, Ser. No. 07/958,174, filed Oct. 8, 1992, now U.S. Pat. No. 5,242,255.

FIELD OF THE INVENTION

This invention relates generally to threaded fasteners and is particularly directed to a thread-forming screw with a tapered end and apparatus and method for the fabrication thereof.

BACKGROUND OF THE INVENTION

The use of thread-forming screws for securely coupling bodies is well known. This type of screw is inserted in an unthreaded bore or aperture and forms threads in the bore or aperture when a torque is applied. The screw structure is highly vibration-resistant for maintaining the coupling between the bodies even when subjected to considerable stress. Some self-threading screws include threads with multiple lobes around the circumference of the screw shank. The lobes, or undulations, further resist loosening of the screw.

Considerable torque is required in forming the threads on the screw's shank. The greater the required torque, the greater the required strength of the screw. The application of increased torque in the threading process as well as providing a screw comprised of materials of greater strength increase the cost of the end product. The goal is, therefore, to form the threads on the screw with a minimum torque. Where the screw is tapered, additional difficulty is encountered in providing the tapered portion with crested, or fully formed, threads. Fully crested threads are desirable because they facilitate insertion of the screw and also render it more difficult to remove the screw. However, providing the tapered end portion of the screw with fully crested threads generally requires a more complicated die configuration and increases the cost and complexity of thread-forming screw manufacture.

The present invention addresses the aforementioned limitations of the prior art by providing a thread-forming screw with a tri-roundular tapered end which facilitates insertion of the screw in a workpiece and maintains the screw securely in position therein.

OBJECTS AND SUMMARY OF THE INVENTION

Accordingly, it is an object of the present invention to provide an improved thread-forming screw characterized by a low driving force/stripping force ratio.

It is another object of the present invention to provide a self-tapping screw for which the thread-forming operation and insertion in a workpiece is accomplished with minimal torque.

Yet another object of the present invention is to provide a thread-forming screw with an improved tapered, threaded point having spaced flats disposed thereabout which facilitates insertion of the screw in an unthreaded body, or workpiece.

These objects of the present invention are achieved and the disadvantages of the prior art are eliminated by a thread-forming screw comprising: an elongated shank having a continuous exterior thread and a plurality of exterior lobes distributed circumferentially about the shank in an equally spaced manner and extending spirally therealong in an angular direction opposite from the thread, the shank having in any plane normal to its axis an inner solid core portion of circular configuration and the lobes projecting outwardly beyond the core portion, the shank including a cylindrical threaded portion and a tapered threaded end portion, wherein the tapered threaded end portion includes a plurality of rounded portions and a plurality of flats arranged in an alternating manner about a periphery thereof and wherein each of the flats forms a respective gap with a portion of a workpiece defining an aperture in which the thread-forming screw is inserted for receiving a portion of the workpiece deformed as the screw is driven to into the workpiece for facilitating driving of the screw into the workpiece and maintaining the screw securely therein.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a simplified schematic diagram illustrating the thread rolling operation in forming a thread-forming screw;

FIG. 5 is a simplified schematic diagram illustrating additional details of the thread and lobe forming operation by a pair of rolling dies for forming a thread-forming screw such as of the present invention;

FIG. 6 is a fragmentary perspective view showing the thread-forming and lobe-forming portions of a die used in forming a screw in accordance with the present invention;

FIG. 10 is a partial plan view of a die for forming an unthreaded blank for subsequent threading in forming a threading-forming screw in accordance with the present invention.

DETAILED DESCRIPTION OF THE PREFERRED EMBODIMENT

Figure 1:
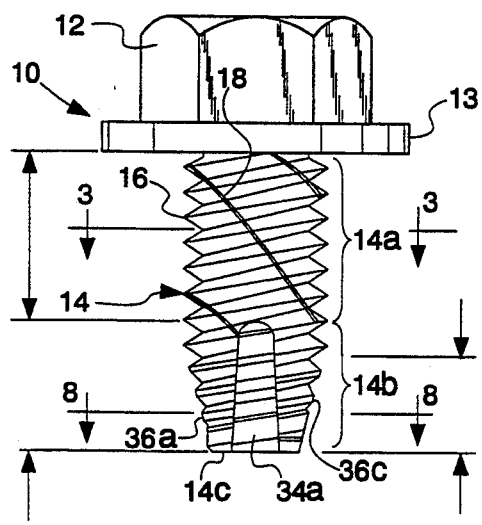
FIG. 1 is a side elevation view of a thread-forming screw in accordance with the principles of the present invention.

Referring to FIG. 1, there is shown a side elevation view of a thread-forming screw 10 in accordance with the present invention. Screw 10 includes a head 12 and an elongated shank 14. The portion of head 12 adjacent shank 14 includes a washer face 13. The shank 14 has an exterior thread 16 as well as a plurality of spaced lobes 18, as more clearly shown in the end-on view of FIG. 2 and the sectional view of FIG. 3 taken along site line 3—3 in FIG. 1. Lobes 18 are circumferentially distributed about the axis of shank 14 and extend spirally there along in an angular direction opposite from that of the thread 16 as shown in FIG. 1. The shank 14 of thread-forming screw 10 includes a straight, cylindrical portion 14a and a tapered, end portion 14b.

Figure 3:
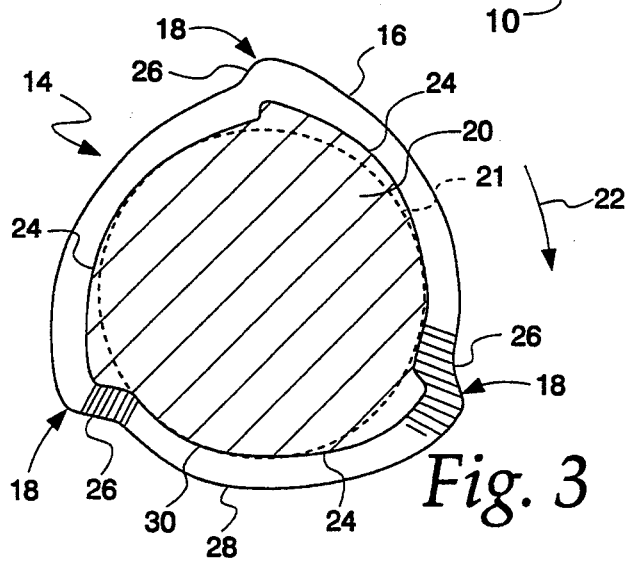
FIG. 3 is a sectional view of the thread-forming screw of FIG. 1 taken along site line 3—3 therein.

In any plane normal to it axis, shank 14 has an inner core portion 20 which is of circular configuration and concentric with its axis, and within the dot-dash line circle 21 shown in FIG. 3. Lobes 18 project from and are integral with the core portion 20, with the core portion comprising the central shank portion within the generated circle 21 coaxial with the shank axis.

Figure 2:
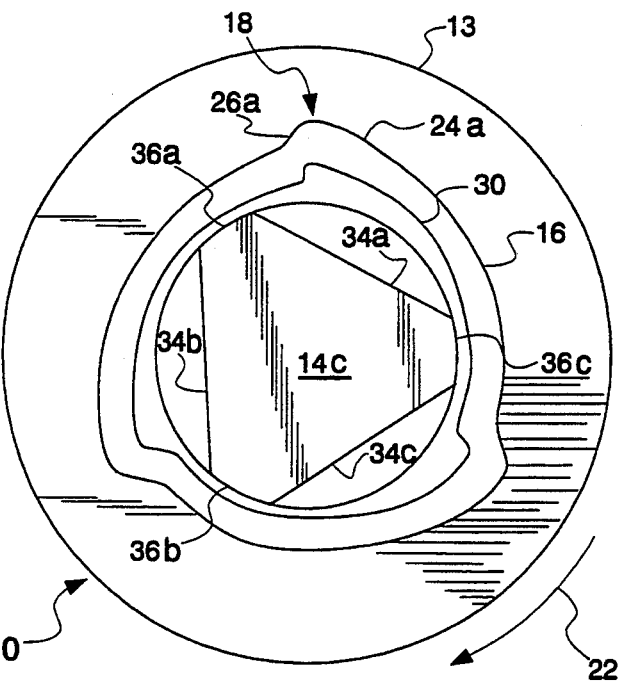
FIG. 2 is an end-on view of the thread-forming screw of FIG. 1.

When the screw is turned into a body, the screw is rotated in the direction of arrow 22 in FIGS. 2 and 3. Each lobe 18 has an elongated leading leg 24 which progresses gradually away from the axis of the shank 14 in the direction of turning 22. Each lobe 18 also has a trailing leg 26 which abruptly turns inwardly toward the shank axis and which is much shorter than the leading leg 24. The lobes 18 are therefore non-symmetrical. Each elongated leading leg 24 is convexly curved and merges smoothly into the trailing leg 26 which is concave only at its innermost region where it adjoins the circular core portion 20 and the leading leg of the next lobe, as shown in FIG. 3. The progression of each leading leg 24 away from the axis of the shank 14 is continuous from the beginning of the leading leg up to its merger with the abruptly returning trailing leg 26. In addition, the thread 16 has between its crest 28 and its root 30 a uniform radial width. Thus, the configuration of lobes 18 and crests 28 of the thread 16 matches the configuration of the lobes along the thread root 30.

In a preferred embodiment, three lobes 18 are uniformly distributed about the shank axis, with each lobe extending over an arc of approximately 120° as shown in FIG. 3. Thread-forming screw 10 is formed by means of a thread roll die, since the lobes are spiral, with the same pressure applied along the entire length of the screw so that slippage in thread rolling is minimized. In addition, roundness of the finished screw is maintained since there is no interruption in the rolling of the lobes, as would be the case if the lobes simply extended axially. Thus, a single rolling operation may be used to form the threads and lobes in the shank 14 of the thread-forming screw 10.

Each lobe 18 in the thread-forming screw 10 gradually, yet continuously, rises to its maximum distance from the shank axis and then abruptly drops back in toward the axis, before the gradual rise which forms the next lobe. Each lobe thus progresses gradually away from the shank axis in the direction in which the screw is turned into a body. When the screw is backed out of the threaded bore, the abrupt heel formed by the shorter trailing leg 26 of each lobe 18 offers resistance to unscrewing, since the metal of the mating threaded part tends to close in behind the trailing leg of each lobe during formation of the thread. Because the threads thus rise and fall according to the conformation of the lobes 18, it is possible to achieve the thread-forming operations in a much easier manner since a lower torque is required than would be the case with the use of, for example, three lobes each of which is of a symmetrical construction such as encountered in other thread-forming screws.

The particular trilobular construction of the thread-forming screw 10 of the present invention allows the screw to form a thread. The thread-forming operation is greatly facilitated by the particular construction of the lobes referred to above. Inasmuch as the lobes are disposed about the shank axis in a spiral, formation of the thread in a body into which the screw 10 is turned is performed smoothly and without any interruption, thus further facilitating the thread-forming operation. Accordingly, the thread-forming screw 10 is especially suitable as a tapping device and the term "thread-forming screw" is intended to encompass such tapping devices having the characteristic lobular construction described above.

Screws of the type described thus far perform well in standard "pull-out" tests. This improved performance is due to the spirally situated lobes and the high point of each lobe located at the exterior of the screw around the entire 360° of the shank such that a pull-out will engage 360° of the mating member. Thus, much more force is required to pull-out a thread-forming screw 10 in accordance with the present invention than any other type of lobular screw in which the lobes are distributed axially along the shank. After the thread-forming screw 10 has been used to form the thread in a hole of a body into which the screw is turned, since the lobes 18 are situated so as to "wipe" in a thread and simultaneously form spirally a thread which is tapped in smoothly around 360° of the shank, a particularly low torque results.

Referring to FIG. 4, there is shown in simplified schematic diagram form an arrangement for forming the threads and lobes in a shank 47. In operation, two dies 32a and 32b are positioned with their working faces parallel to each other and spaced apart by an amount sufficient to accommodate the shank 47 of a blank to be formed into a thread-forming screw. While upper die 32a remains stationary, lower die 32b is displaced in the plane of their working surfaces, as indicated by the direction of arrow F in FIG. 4, so that the shank 47 is rotated clockwise, as indicated by the arrow C. During the initial portion of the thread rolling operation, the nonundulated portions of the grooves and ridges in the dies 32a and 32b form threads about the shank 47 in a conventional manner. Thereafter, however, undulations in the dies 32a, 32b which are described below engage the shank 47 to form the lobes in the screw threads.

Referring to FIG. 5, there is shown in stylized form in cross section additional details of the rolling of a trilobular threaded blank 40 between two threaded dies 42 and 43. It should be emphasized that FIG. 5 is stylized and does not accurately represent actual thread-forming conditions. Threaded blank 40 includes a thread crest 44 and a thread root 46, both represented in solid-line form. Similarly, dies 42 and 43 include thread-forming ridges 48 and grooves 50, also represented in solid-line form. In a true cross sectional, view, the thread grooves 46 of blank 40 and the grooves 50 of dies 42 and 43 would be shown in dotted-line form. Also in an actual cross sectional view, the thread on blank 40 would spiral down and become overlapped on itself at some point and the lobes would also experience a similar condition since they also undergo spiraling. These discrepancies have been introduced to simplify the drawing and aid in visualizing the rolling action of the blank 40 between dies 42 and 43.

As described above with respect to FIG. 5, during rolling of the blank 40, the upper die 42 moves rightward as indicated by the direction of arrow A, while the lower die 43 remains stationary. This, of course, corresponds to relative leftward movement of the lower die 43 with respect to the upper die 42, as indicated by the direction of arrow B in the figure. This relative die movement causes the blank 40 to roll clockwise in the direction of arrow C about an axis O. During this rolling the blank thread crest 44 contacts the die grooves 50 and the blank thread root 46 contacts the die ridges 48. Dies 42 and 43 remain a fixed distance apart and the axis O of blank 40 remains centered therebetween. The rolling of the blank thread on either die therefore resembles the rolling of a flanged wheel on a track. If the point of roll against the lower die 43 is at the point of contact between the blank thread root 46 and the corresponding die ridge 48, then the thread crest 44 must slip backwardly relative to the corresponding die groove 50 as indicated by the direction of arrow D. On the other hand, if the point of roll is at the thread crest 44 of the blank (and at the bottom of the disc groove 50) then the thread root 46 is forced to slip forward as indicated by the arrow E. A similar action occurs where the blank 40 engages the upper die 42. For any point of rolling between the crest and root, similar slippages will occur at both the crest and root. Because of these slippages, a given distance along a die in any plane other than that in which the actual rolling takes place does not correspond to the same distance along the thread being rolled. While this does not have any appreciable effect in the formation of a continuous thread, it does have an effect where irregularities, i.e., lobes, are to be formed in the disc. In the present case, where the die formations have pressings, which are described in detail below, the spacing L between successive pressings will not register with corresponding lobe formations 54 on the blank during rolling unless the distance is the same as the circumferential distance about the blank 40 measured at the plane of actual roll. Thus, the distance between successive lobe forming pressings along a die is equal to the circumferential distance between successive lobes to be formed on the screw measured along a cylindrical plane having a diameter approximately half way between the pitch diameter and the pressed, or major, diameter of the screw.

Figure 7:
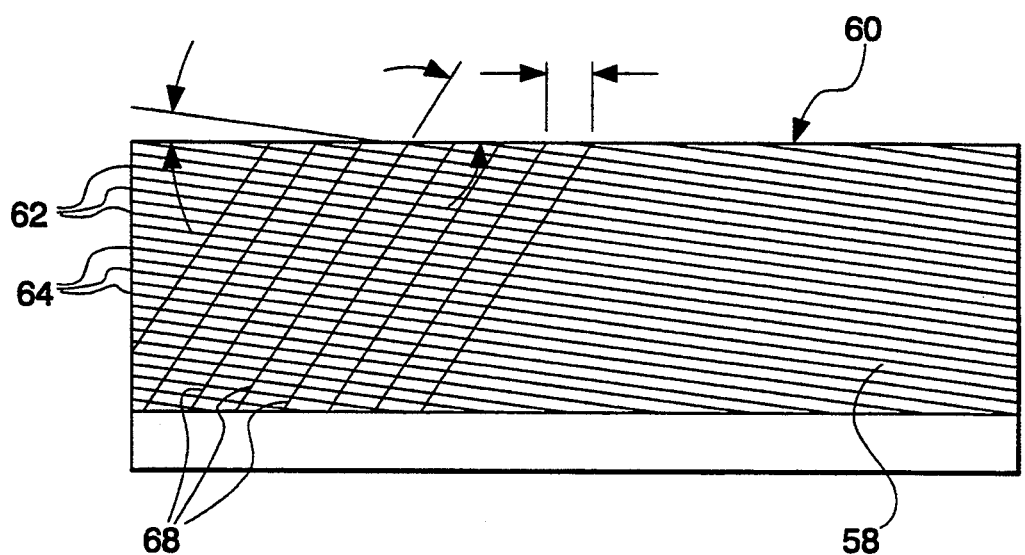
FIG. 7 is an elevational view of the screw forming die of FIG. 6.

Referring to FIGS. 6 and 7, there are respectively shown a partial perspective view and an elevation view of a die 60 used in forming a thread-forming screw in accordance with the principles of the present invention. A thread-forming surface 58 of die 60 has ridges 62 and grooves 64 which extend continuously toward the right, or entrance end of the die. Toward the left or finishing end of the die, however, the ridges 62 and grooves 64 making up the thread-forming surface 58 are interrupted or undulated with respect to the plane of the die working surface. These undulations are arranged in slanted columns as indicated by interruption lines 68. It will be noted that the columns extend at a column angle with respect to the upper and lower surfaces of the die and with respect to the path of die movement. This angle is the same as the helix angle of the lobe spiral shown by the lines 18 in FIG. 1. It should also be noted that the ridges 62 and grooves 64 extend at a helix angle $\alpha$ with respect to the upper and lower die surfaces and the path of die movement. This angle $\alpha$, which is in a direction opposite to that of the angle, is the same as the helix angle of the thread 16 in FIG. 1. With reference to FIG. 6, it will be seen that the undulations in the thread-forming surface 58 of die 60 are actually a series of "pressings" 66 whereby the ridges 62 and grooves 64 are actually tilted or slanted slightly with respect to the plane of the thread-forming surface without appreciable change in cross section, contour or helix angle $\alpha$. The depth of the pressings 66, i.e., the distance from the highest to the lowest point on a ridge 62 or on a groove 64 of each pressing measured in a direction perpendicular to the plane of the thread-forming surface 58, may vary according to the thread size. It should also be noted that each pressing 66 is asymmetrical, i.e., it rises gradually outwardly with respect to the plane of the thread-forming surface 58 over most of its length in a leftward direction and then returns rather abruptly back inwardly with respect to the working surface plane. This configuration produces an asymmetrically lobed thread as described above with respect to FIGS. 3 and 5. It will also be understood that the die arranged in spaced relation to die 60 has thread-forming ridges and grooves and lobe forming undulations or pressings identical in size and shape to those of die 60, but reversed as to column and helix angle and $\alpha$ so as to complement die 60.

The pitch P is the distance between two corresponding points on adjacent screw threads or the distance traveled by a screw in a single revolution. The distance P/2 is one-half the pitch or the distance between adjacent ridges 62 or adjacent grooves 64. The pitch diameter plane is a plane passing midway between the parallel arrays of ridges 62 and grooves 64, while the pitch diameter D is the distance between the aligned ridges and grooves in a direction transverse to the pitch diameter plane.

Figure 8:
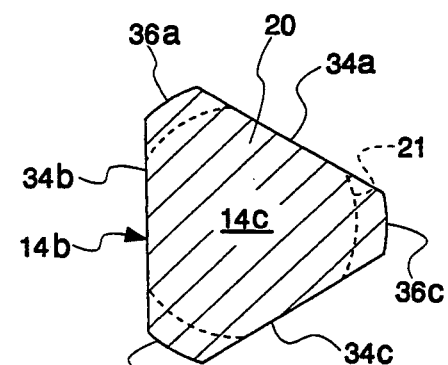
FIG. 8 is a sectional view of the thread-forming screw of FIG. 1 taken along site line 8—8 therein.

Referring to FIG. 8, there is shown a sectional view of the tapered portion of screw 10 shown in FIG. 1 taken along site line 8—8 therein. The tapered portion 14b of the screw's shank 14 includes three spaced flats 34a, 34b and 34c and three spaced rounded portions 36a, 36b and 36c, with each of the flats disposed intermediate a pair of rounded portions. The tapered portion 14b of shank 14 terminates in a flat end portion 14c. The reduced cross section of the tapered portion 14b of shank 14 includes only a portion of the shank's inner core 20 defined by the dotted line circle 21 as shown in FIG. 8. Each of the flats 34a, 34b and 34c forms an angle on the order of 20° relative to the longitudinal axis of shank 14. In one embodiment, the shank's tapered portion 14b extends 2½–3 pitches along the length of the shank, while the three flats 34a, 34b and 34c extend 3½–4 pitches. As shown for flats 36a and 36c in FIG. 1, the three flats include four pitches of threads, with reduced cresting in proceeding toward the end of the screw. As described below, a tapered blank is disposed intermediate a pair of generally planar thread-forming dies. The tapered configuration at the end of the blank results in the formation of partial, or incompletely formed, threads on the flats 34a, 34b and 34c and on the rounded portions 36a, 36b and 36c as shown in FIG. 1.

Figure 9:
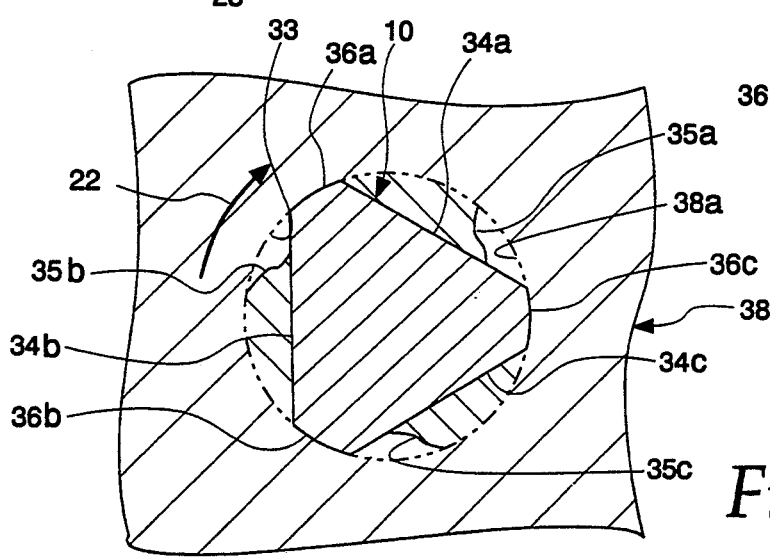
FIG. 9 is a sectional view of the tapered portion of a thread-forming screw in accordance with the present invention inserted in the aperture of a workpiece and rotated in the direction of the arrow in forming threads in the workpiece.

Referring to FIG. 9, there is shown a partial sectional view of a thread-forming screw 10 in accordance with the present invention being driven into the aperture, or bore, 38a of a workpiece 38. The thread-forming screw 10 is rotated in the direction of the arrow 22 in the figure as it is inserted in aperture 38a. As screw 10 is rotated and the threads on its tapered end portion engage the portion of the workpiece 38 defining aperture 38a, the three rounded portions 36a, 36b and 36c engage and deform the workpiece resulting in the deposit of redistributed material of the workpiece in the space disposed intermediate the three flats 34a, 34b and 34c and the portion of the workpiece defining its aperture 38a. The three flats 34a, 34b and 34c thus form three pockets, or gaps, 33 with the inner portion of the workpiece 38 defining aperture 38a. Thus, respective portions of workpiece redistributed material 35a, 35b and 35c are displaced by an adjacent respective rounded portion 36a, 36b and 36c as the thread-forming screw 10 is rotated in aperture 38a. The first, second and third portions 36a, 36b and 36c of the workpiece redistributed material become lodged in tight-fitting engagement between respective flats 34a, 34b and 34c and the inner portion of workpiece 38 defining its aperture 38a. The threads on the three rounded portions 36a, 36b and 36c securely engage and form complementary threads on the inner portion of workpiece 38 defining its aperture 38a. In addition, the partial threads on the first, second and third flats 36a, 36b and 36c engage respective portions 35a, 35b and 35c of the workpiece redistributed material for further increasing the extent of coupling of the thread-forming screw 10 within the workpiece 38 and the backing out torque required to remove the screw. Respective outer portions of the first, second and third portions 35a, 35b and 35c of the workpiece redistributed material are also disposed in intimate contact with the threads formed on the inner portion of workpiece 38 defining its aperture 38a. The three spaces disposed intermediate flats 34a, 34b and 34c and the inner portion of the workpiece 38 defining its aperture 38a provide relief when screw 10 is inserted in aperture 38a by receiving portions of the workpiece redistributed and displaced during insertion of the screw and thus facilitate rotation of the screw in the workpiece while securely maintaining the screw in the workpiece after insertion.

Referring to FIG. 10, there is shown a plan view of a press die 80 used in forming a screw prior to the previously described threading operation in accordance with the present invention. Press die 80 operates in conjunction with a complementary sized and shaped press die which is not shown in the figure for simplicity. The two dies are pressed tightly together in forming a pair of thread-forming screws in accordance with the present invention. Press die 80 has a generally flat upper surface 80a which includes first and second recesses 82 and 84. The first recess 82 includes a cylindrical outer portion 82a and a tapered inner portion 82b. Similarly, the second recess 84 includes a cylindrical outer portion 84a and a tapered inner portion 84b. Each of the tapered inner portions 82b and 84b include one or more flats 86 and 88, respectively, for forming the three flats on the end of a screw blank. An untapered, unthreaded screw blank is inserted in each of the first and second recesses 82 and 84 in press die 80 and a complementary press die having corresponding recesses (not shown for simplicity) is pressed in intimate contact with press die 80 for forming two unthreaded, tapered screw blanks in accordance with the present invention.

Figure 11:
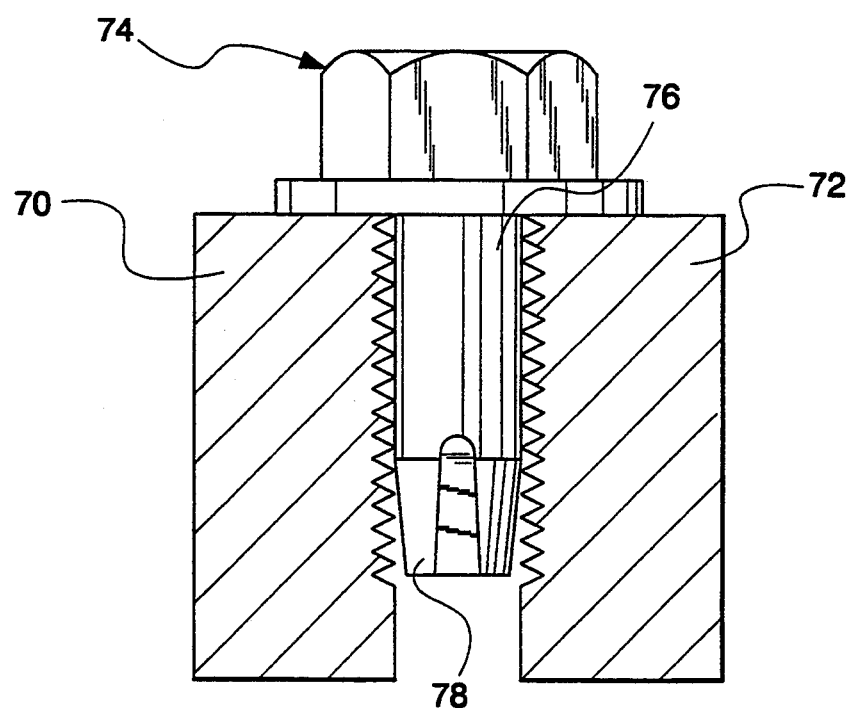
FIG. 11 is a simplified sectional view illustrating a screw fabricated in accordance with the present invention in position between thread-forming dies prior to initiation of the thread-forming operation.

Referring to FIG. 11, there is shown a simplified sectional view of the manner in which threads are formed in a blank 74 with a tri-roundular point 78 on one end of the blank's shank 76. Blank 74 is positioned between first and second roll dies 70 and 72 each having a facing thread-forming surface as previously described with respect to FIGS. 6 and 7. One of the dies is displaced relative to the other resulting in the rolling of blank 74 between the two dies and the formation of lobes and threads on the screw's shank 76 and its tri-roundular tapered point 78 as previously described.

There has thus been shown an improved thread-forming screw and method of manufacture therefor. The inventive thread-forming screw includes a shank having a tapered tri-roundular end portion including, in one embodiment, three spaced flats and three round portions disposed in an alternating manner about the screw's periphery. The screw is formed by inserting a tapered blank between paired dies each having a generally planar array of threads provided with undulations along their lengths corresponding to the circumference of the screw blank so as to form a trilobular thread on the screw which spirals around its circumference from one end of the cylindrical, untapered shank portion of the screw to the other in a direction opposite to that of the threads. The alternating flats and rounded portions on the tapered end of the screw are provided with partially formed threads. The three spaced flats on the tapered end of the screw provide relief from contact with the workpiece into which the screw is driven for receiving deformed, displaced portions of the workpiece as the screw is driven into a workpiece aperture. The relief gaps, or pockets, for receiving the deformed, displaced portions of the workpiece facilitate driving the screw into the workpiece while providing a high screw strip force. The displaced, deformed portions of the workpiece disposed in the relief gaps are engaged by the facing threads of the screw's tapered end portion and the workpiece's aperture for secure retention of the screw in the workpiece. In one embodiment, the tapered end portion of the screw includes 2–3 pitches, while the flats extend 3–4 pitches from the end of the screw.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A thread-forming screw comprising: an elongated shank having a continuous exterior thread and a plurality of exterior lobes distributed circumferentially about said shank in an equally spaced manner and extending spirally therealong in an angular direction opposite from said thread, said shank having in any plane normal to its axis an inner solid core portion of circular configuration and said lobes projecting outwardly beyond said core portion, said shank including a cylindrical threaded portion and a tapered threaded end portion, wherein said tapered threaded end portion includes a plurality of rounded portions and a plurality of flats arranged in an alternating manner about a periphery thereof and wherein each of said flats forms a respective gap with a portion of a workpiece defining an aperture in which the thread-forming screw is inserted for receiving a portion of said workpiece deformed as the screw is driven to into said workpiece for facilitating driving of the screw into said workpiece and maintaining the screw securely therein, wherein said tapered end portion includes on the order of three (3) pitches and wherein each of said flats extends on the order of four (4) pitches.

2. The thread-forming screw of claim 1 wherein said tapered end portion includes 2½–3 pitches.

3. The thread-forming screw of claim 2 wherein each of said flats extends over 3½–4 pitches.

4. The thread-forming screw of claim 1 wherein said tapered threaded end portion includes three (3) rounded portions and three (3) flats disposed in an alternating manner about the periphery thereof.

5. A thread-forming screw comprising: a head; and an elongated shank coupled at a first end to said head and having a continuous exterior thread and a plurality of exterior lobes distributed circumferentially about said shank in an equally spaced manner and extending spirally therealong in an angular direction opposite from said thread, said shank having in any plane normal to its axis an inner solid core portion of circular configuration and said lobes projecting outwardly beyond said core portion, said shank including a cylindrical threaded portion and a tapered threaded end portion; and wherein said tapered threaded end portion includes relief means displaced inwardly from an inner portion of a workpiece defining an aperture in which said screw is inserted for receiving a deformed portion of said workpiece formed when the screw is rotated in said aperture for facilitating insertion of the screw and maintaining the screw securely in said workpiece, wherein said relief means includes at least one flat on the tapered threaded end portion of said screw forming a gap between said screw and the inner portion of said workpiece defining said aperture, and wherein said tapered threaded end portion further includes a plurality of threaded round portions each disposed adjacent said at least one flat, and wherein said threaded round portions each include on the order of three (3) pitches and said at least one flat extends on the order of four (4) pitches.

6. The thread-forming screw of claim 5 wherein said relief means includes a plurality of flats disposed in a spaced manner about the tapered threaded end portion of said screw.

* * * * *